Figure 1:
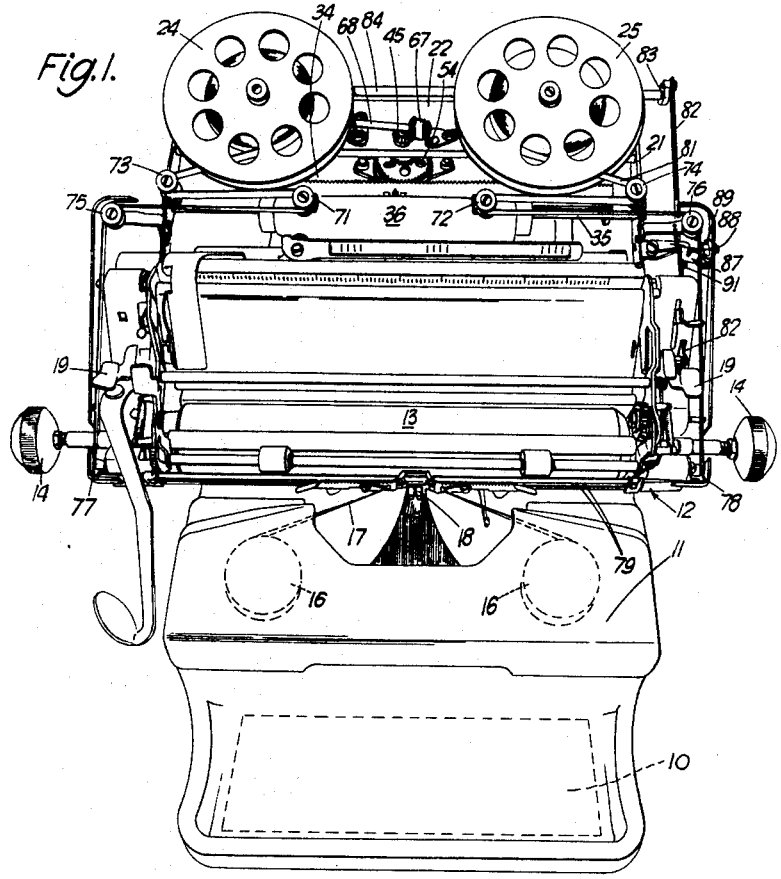

Sept. 21, 1965  A. B. PATEMAN ETAL  3,207,284
RIBBON FEED DEVICE FOR TYPEWRITING AND LIKE MACHINES
Filed May 14, 1962  3 Sheets-Sheet 1

INVENTORS
Arthur B. Pateman
Samuel A. Ledham

By Watson, Cole Grindle & Watson
ATTORNEYS.

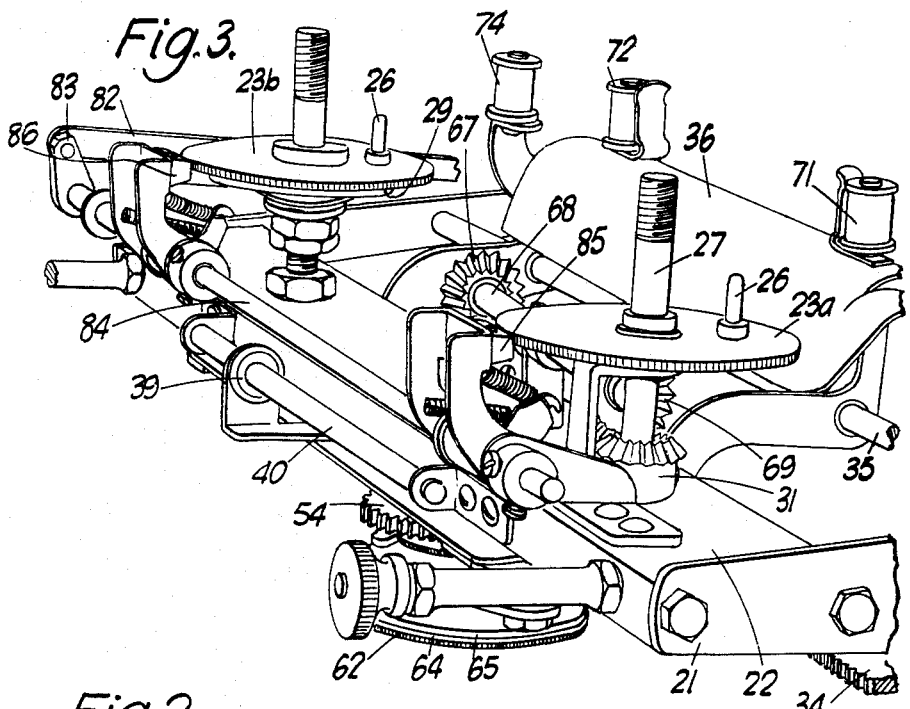
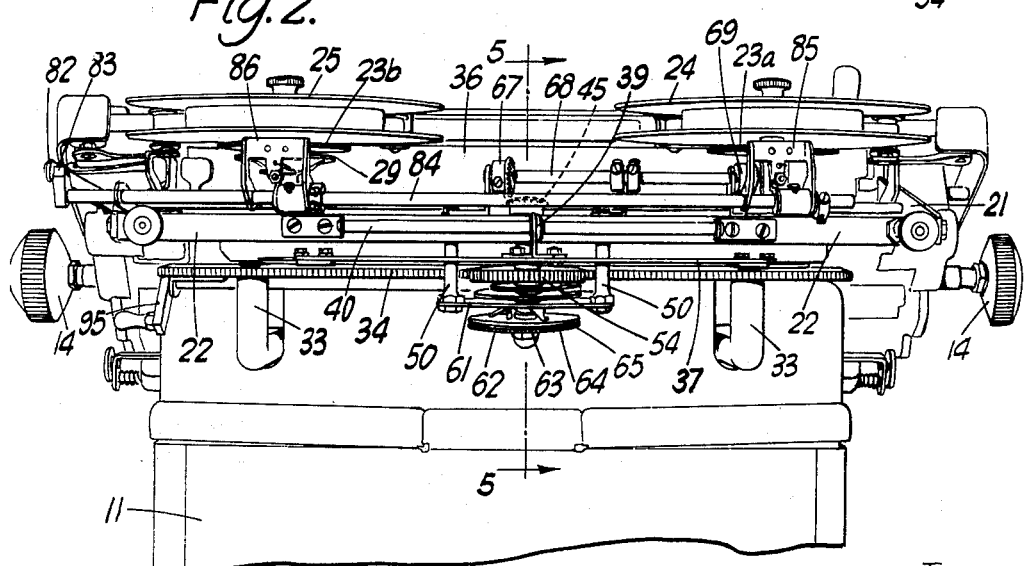

INVENTORS
Arthur B. Pateman
Samuel A. Leadham

By Watson, Cole, Grindle & Watson
ATTORNEYS

United States Patent Office 3,207,284
Patented Sept. 21, 1965

3,207,284
RIBBON FEED DEVICE FOR TYPEWRITING AND LIKE MACHINES
Arthur Bott Pateman, Rothley, Leicester, and Samuel Alan Leedham, Leicester, England, assignors to Imperial Typewriter Company Limited, Leicester, England, a British company
Filed May 14, 1962, Ser. No. 195,046
Claims priority, application Great Britain, Sept. 12, 1961, 32,779/61
8 Claims. (Cl. 197—151)

This invention relates to ribbon feed devices for typewriting or like machines.

According to the invention there is provided a typewriting or like machine comprising a base, a carriage which includes a platen and which is movable in one direction relative to the base in one sense during typing and in the other sense for return of the carriage, a pair of carriers for ribbon spools, guide means for guiding ribbon from a ribbon spool on one of the carriers to and along the front of the platen parallel to the said direction, which guide means includes a pair of ribbon guides carried on a member movable in a direction parallel to the said one direction relative to the base and to the carriage on movement of the carriage relative to the base. The said member is preferably caused to be moved relative to the base one-and-a-half times the distance the carriage moves relative to the base.

Movement of the said member may preferably be caused by a gear mechanism comprising first and second racks, interconnected first and second gear wheels rotatable about a common axis and meshing respectively with the first and second racks, the first and second racks and the said axis each being fixed relative to one of the following three parts namely, the base, the carriage and the said member.

Means are preferably provided for rotating one of the spool carriers when the carriage is moved in the said one sense relative to the base, e.g. by making an impression with a type. Preferably the drive to the means for rotating the said one of the spools includes a ratchet and pawl device or other unidirectional device so that the drive to the spool only occurs on movement of the carriage relative to the base in the said one sense of the said one direction.

Unidirectional means are preferably provided to prevent ribbon being fed back on to the other of the spools, so that the ribbon will move in synchronism with the carriage past a position, e.g. opposite the type bar fork, fixed with respect to the base. Preferably friction means is provided for applying a light restraint to free rotation of the said other spool.

Most typewriting machines comprise a carriage rack engaged by an escapement pinion and a tabulator or a release lever which causes disengagement of the carriage rack and the escapement pinion. The typewriting machine of the invention may preferably comprise means for locking against rotation spools carried on the carriers, which locking means may be moved into a locking position on operation of the tabulator or the release lever. Further, means are preferably provided for rendering the unidirectional means inoperative when the locking means is moved into its locking position.

Figure 4:
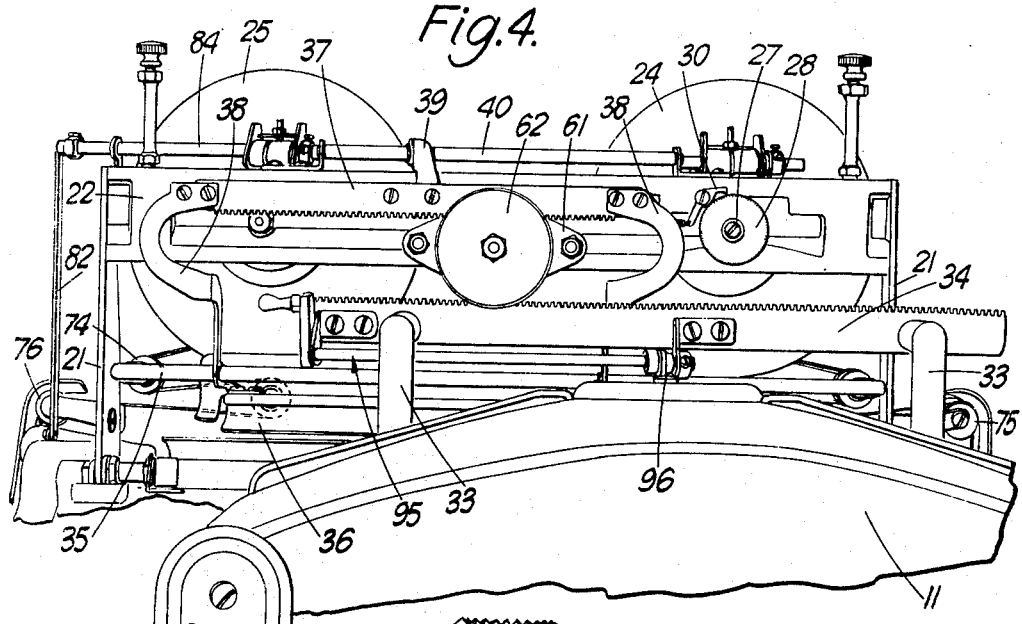
Figure 5:
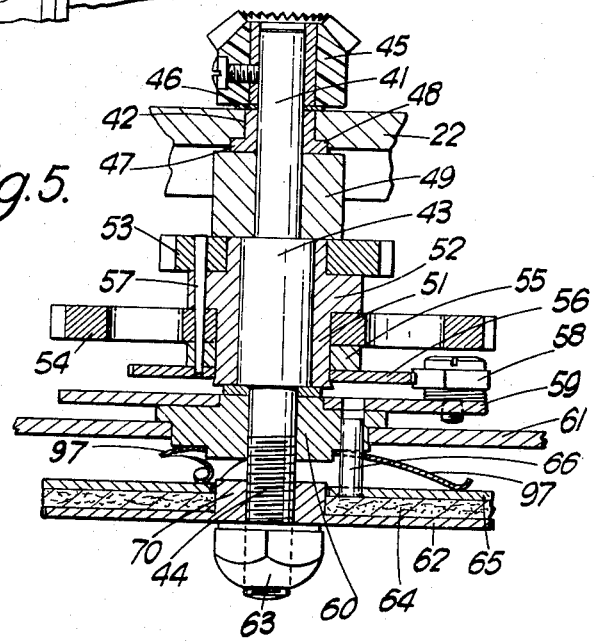

One embodiment of the invention will now be described with reference to the accompanying drawings in which:
FIGURE 1 is a perspective plan view of a typewriting machine of the invention;
FIGURE 2 is a perspective back view of the machine of FIGURE 1;
FIGURE 3 is a perspective side view of a detail of the back of the machine with certain parts removed;
FIGURE 4 is a perspective bottom plan view of part of the machine of FIGURE 1; and
FIGURE 5 is a detail section to a large scale on line 5—5 of FIGURE 2.

Referring now to the drawings, a typewriting machine of the invention comprises a conventional base 11, carriage 12 and keyboard 10. The carriage comprises a cylindrical platen 13 which is rotatable in the carriage by means of knurled knobs 14. The carriage is movable in one direction along guides (not shown) in one sense during typing and in the opposite sense for return of the carriage to begin a new line. The base 11 has conventional typewriting ribbon holders carrying ribbon spools 16 between which extend a ribbon 17 guided to a typing station adjacent a type-bar fork 18. The typewriter further comprises the conventional tabulator key (not shown) and rack operating levers 19. These are operable in conventional manner to lift the carriage rack (not shown) so that the carriage 12 may be movable freely, or under the influence of the typewriter spring, relative to the base 11.

A pair of side members 21 project from the back of the carriage 12 and carry a platform 22. The platform 22 carries at spaced locations a pair of spool carriers 23a, 23b (see FIGURE 3) which have serrated peripheries and which respectively carry a take-up spool 24 and a supply spool 25. A pin 26 is provided on each carrier 23a, 23b whereby each carrier may positively engage the spool carried thereby. A light friction brake 29 in the form of an oil loaded felt pad carried by a brake disc is spring urged against the underside of the spool carrier 23b. A ratchet wheel 28 (see FIGURE 4) is mounted on the spindle 27 of the spool carrier 23a below the platform 22. A spring urged pawl 30 engages the ratchet wheel 28 to permit unidirectional movement of the spool carrier 23a. Also mounted on the spindle 27 but above the platform 22 is a bevel gear 31 (see FIGURE 3) connected to be driven as will be hereinafter described. Two stout tubular supporting members 33 project from the back of the typewriter base 11 and these carry a rack 34 (see FIGURE 4) which extends parallel to the direction of the movement of the carriage 12. The side members 21 also carry a cross rod 35 on which is slidably mounted a reciprocator member 36. The reciprocator member 36 carries a second rack 37 by means of two supporting members 38 which are fixed for movement therewith. Carried at the rear of the rack 37 is a bearing 39, which is slidable on a rod 40 carried by the platform 22 and which serves as an additional support for the rack 37. The two racks 34 and 37 face each other and the rack 37 is set at a slightly higher level than the rack 34.

A spindle 41 (see FIGURE 5) projects through an aperture 42 in the support platform 22. This spindle 41 is stepped to an enlarged portion 43 below the platform 22 and at its lower end is screw threaded at 44. A bevel gear 45 is fixed to the spindle 41 above the platform 22 and rests on a washer 46. A flanged bush 47 is inserted in the aperture 42 between the spindle 41 and the platform 22 and its flange 48 rests on the upper end of a sleeve 49 which surrounds the spindle 41 and rests on the step of the spindle 41 leading to the enlarged diameter portion 43. A further bush 51 surrounds the enlarged portion 43 of the spindle 41. This bush 51, which is provided with an enlarged spacer part 52, carriers a smaller pinion 53, a larger pinion 54 having twice the number of teeth as the pinion 53, a spacer ring 55 and a ratchet wheel 56 all of which are connected by a pin 57 for rotation together relative to the spindle 41. The smaller pinion 53 rests on the spacer part 52 which in turn rests on the larger pinion 54. The larger pinion rests on the spacer ring 55 and this is carried by the ratchet wheel 56. An inwardly urged pawl 58 is carried on a disc 59 so as to be able to engage the ratchet wheel 56. The disc 59 is carried on a bush 60 resting in an aperture in a platform 61 which is carried from the platform 22 by bolts 50 (see FIGURE 2). Below the platform 61 the spindle 41 carries a driven disc 62 which is mounted on a threaded bush 70 and is locked onto the spindle 41 by means of a nut 63 engaging the screwthreads and is rotatable with the spindle 41. Bearing on the upper side of the disc 62 is an oil loaded felt pad 64 carried between the driven disc 62 and a driver disc 65 which is connected to the disc 59 by a pin 66 to rotate therewith. A spider spring 97 urges the discs 62 and 65 into close driving engagement to constitute a slipping clutch.

The bevel gear 45 engages another bevel gear 67 carried at one end of a freely rotatable spindle 68 which at its other end carries a further bevel gear 69 (see FIGURE 3) that meshes with the bevel gear 31 on the spindle 27.

The smaller pinion 53 engages the second rack 37 and the larger pinion 54 engages the first rack 34.

Thus on movement of the carriage 12 relative to the base 11, the larger gear wheel 54 which engages the rack 34 will be rotated thereby and will rotate the pinion 53. The pinion 53 which engages with the rack 37 will cause the rack, and with it the reciprocator member 36, to move relative to the base 11 at one-and-a-half times the speed of the carriage 12 relative to the base 11 (i.e. relative to the carriage 12 at half the speed which the carriage 12 moves relative to the base 11). At the same time rotation of the large gear wheel 54 will cause rotation of ratchet wheel 56 and, through the pawl 58, driving plate 59. This will cause rotation of the slipping clutch arrangement of the discs 62 and 65 and the interposed washer 64, the spindle 41, the bevel gears 45 and 67, the spindle 68 and bevel gears 69 and 31, the spindle 27 and the take-up-spool 24. This movement of the take-up-spool 24 will be caused only when the carriage 12 moves relative to the base 11 in the said one sense, i.e. during typing, as, when it moves in the opposite sense, the motion of the gear wheels 53 and 54 is not transmitted to the disc 59 and hence disc 65, because of the unidirectional engagement of the pawl 58 with the ratchet 56.

The reciprocator member 36 carries, at opposite ends, two roller ribbon guides 71 and 72. Two further pairs of ribbon roller guides and a pair of turning guides are also provided. One pair of roller guides 73, 74 are mounted respectively on the two side members 21 and the second pair 75, 76 are carried respectively at opposite ends of the rear of the carriage adjacent to and forwardly of the first pair 73, 74. The pair of turning guides 77, 78 are carried at opposite ends of the front portion of the carriage 12. The pair of turning guides 77, 78 turn the ribbon 81 so that it extends behind two wires 79 in front of the platen 13 and behind the type-bar fork 18.

The ribbon 81 is suitable for printing reverse characters on the back of, for example, a hectograph master sheet. The ribbon 81 is led from the supply spool 25 over guide rollers 74, 72, and 76 and through a unidirectional clamp 87. This clamp 87 comprising a spring urged lever 88 which nips the ribbon 81 against a rubber pad 89 provided to prevent the ribbon being fed back towards the supply spool 25. The ribbon 81 then passes over the guide 78 in front of the platen 13 and then over guides 77, 75, 71, 73 and onto the take-up-spool 24.

During typing, tension is applied to the take-up-spool 24 by the means hereinbefore described and the supply spool 25 is substantially freely rotatable except for the light restraint due to the brake 29. Further, the unidirectional clamp 87 will be applied to the ribbon 81 preventing movement of the ribbon in the direction opposite to the direction of movement of the carriage 12. On movement of the carriage 12 due to a typing operation, the roller 72 will move away from rollers 74 and 76 by half the distance of the movement of the carriage 12 relative to the base 11. The roller 71 will move towards the rollers 73 and 75 by the same distance as roller 72 moves away from rollers 74 and 76. As the unidirectional clamp 87 prevents ribbon from being fed back from in front of the platen 13, the extra ribbon required to pass over the rollers 74, 72 and 76 will be paid out by supply spool 25. The excess ribbon over rollers 73, 71 and 75 will be taken up by the tensioned take-up-spool 24. The relative movements of the carriage 12 and reciprocator 36 are such that the length of ribbon 81 between guides 77 and 78 will remain fixed relative to the carriage 12 during typing movements thereof.

It will be seen that if both the rollers 24 and 25 were to be prevented from rotating about their axes, and the clamp 87 was to be rendered inoperative, the part of the ribbon 81 opposite the type-bar fork 18 would not move relative to the type-bar fork 18 in spite of movement of the carriage 12 relative to the base 11. To prevent the spools 24 and 25 rotating, a linkage 82 is connected to the rack release lever 19 and through it to the carriage rack for movement thereby when the carriage rack is lifted into its position clear of the escapement pinion either by the release lever 19 or by the tabulator. This linkage connects with a crank arm 83 on a cross rod 84 that carries for rotation therewith two brake pieces 85 and 86 (see FIGURE 3) which, when the linkage 82 is actuated by the carriage release lever 19 or the tabulator, are moved into engagement with the serrated peripheries of the spool carriers 23a and 23b respectively to lock the spools 24 and 25 against rotation. The linkage 82 also has a finger 91 which bears against the unidirectional clamp lever 88 and moves the said clamp 87 to the inoperative position when the linkage is actuated. In this way the carriage 12 may be moved by the tabulator or the release lever 19 without the ribbon 81 being advanced relative to the type-bar fork 18.

By means of the unidirectional clamp 87 and because of the fact that there will be no drive to the take-up-spool 25 (because of the unidirectional ratchet and pawl mechanism 56, 58) when the carriage is moved in the opposite or return sense, e.g. to start a fresh line of typing, the spools 24 and 25 will again not move when the carriage is being returned from left to right and the part of the ribbon opposite the type-bar fork 18 will also not be moved relative to the type-bar fork 18 during this movement.

A lever operated linkage 95 is provided to facilitate operation of the individual tabulator stop clearing lever 96 which is located at the rear of the frame 11 among the parts carried by the members 21 and 33.

The typewriting machine hereinbefore described provides a convenient means for feeding hectograph or like ribbon between a platen and a hectograph master on which typewritten impressions are to be made and in which the hectograph ribbon is capable of being substantially entirely used with a minimum of portions on the ribbon not typed upon.

We claim:

1. A typewriting or like machine comprising a base, a carriage including a platen, which carriage is carried by and movable in one direction relative to the base, in one sense, during typewriting, and in the other sense for the return of the carriage, a pair of carriers for ribbon spools, said carriers being carried by the carriage for movement therewith as aforesaid, a plurality of ribbon guides for guiding ribbon from a ribbon spool on one of the carriers to and along the front of the platen parallel to the said direction, a member operatively connected to the base to be movable relative thereto and relative to the carriage parallel to the direction of movement of the carriage, the said member carrying a pair of said ribbon guides, and means for moving said member relative to the base and relative to the carriage in predetermined relationship to the movement of the carriage relative to the base.

2. A typewriting or like machine comprising a base, a carriage including a platen, which carriage is carried by and movable in one direction relative to the base, in one sense, during typewriting, and in the other sense for the return of the carriage, a pair of carriers for ribbon spools, a plurality of ribbon guides for guiding ribbon from a ribbon spool on one of the carriers to and along the front of the platen parallel to the said direction, a member operatively connected to the base to be movable relative thereto and relative to the carriage parallel to the direction of movement of the carriage, the said member carrying a pair of said ribbon guides, and a gear mechanism for causing movement of the said member, which gear mechanism comprises first and second racks, interconnected first and second gear wheels rotatable about a common axis and meshing respectively with said first and second racks, the first and second racks and the said axis each being fixed relative to a different one of the following three relatively movable parts namely the base, the carriage and the said member.

3. A typewriting or like machine comprising a base, a carriage including a platen, which carriage is carried by and movable in one direction relative to the base, in one sense, during typewriting, and in the other sense for the return of the carriage, a pair of carriers for ribbon spools, a plurality of ribbon guides for guiding ribbon from a ribbon spool on one of the carriers to and along the front of the platen parallel to the said direction and then onto another ribbon spool on the other of the carriers, a member operatively connected to the base to movable relative thereto and relative to the carriage parallel to the direction of movement of the carriage, the said member carrying a pair of said ribbon guides, means for moving said member relative to the base and relative to the carriage in predetermined relationship to the movement of the carriage relative to the base, and means for rotating one of the spool carriers when the carriage is moved in the said one sense relative to the base, which said means includes a unidirectional device so that the drive to the spool only occurs on movement of the carriage relative to the base in the said one sense of the said one direction.

4. A typewriting or like machine comprising a base, a typewriting keyboard carried by the base, a carriage carried by the base and movable in one direction relative to the base, in one sense during typewriting, and in the other sense for return of the carriage, a platen carried by the carriage, a ribbon feed spool carried by the carriage on the side of the carriage remote from the typewriting keyboard, a ribbon take-up-spool carried by the carriage adjacent to the ribbon feed spool, a ribbon, a member carried by the carriage between the spools and the carriage for movement relative to the base and relative to the carriage in a direction parallel to the carriage, guide means for the ribbon comprising a plurality of ribbon guides carried by the base and two ribbon guides on the said member, the ribbon being passed from the ribbon feed spool over some of the ribbon guides including one of the ribbon guides on the said member to in front of and along the platen, and then over the other ribbon guides, including the other of the ribbon guides on the said member to the ribbon take-up-spool, and means for moving the said member relative to the base and relative to the carriage in predetermined relationship to the movement of the carriage relative to the base.

5. A machine as claimed in claim 1 in which the said moving means comprises a gear mechanism for causing movement of the said member, which gear mechanism comprises first and second racks, interconnected first and second gear wheels rotatable about a common axis and meshing respectively with the first and second racks, the first and second racks and the said axis each being fixed relative to a different one of the following three relatively movable parts namely, the base, the carriage and the said member.

6. A machine as claimed in claim 1 wherein means are provided for rotating one of the spool carriers when the carriage is moved in the said one sense relative to the base.

7. A machine as claimed in claim 2 wherein unidirectional means are provided to prevent ribbon being fed back on to the other of the spools.

8. A machine as claimed in claim 3 wherein friction means is provided for applying a light restraint to free rotation of the said other spool.

References Cited by the Examiner

UNITED STATES PATENTS

| | | | |
|---|---|---|---|
| 569,626 | 10/96 | Fisher | 197—152 X |
| 1,682,333 | 8/28 | Hart | 197—153 |
| 2,058,859 | 10/36 | Fried | 197—153 |
| 2,103,734 | 12/37 | Schmidt | 197—153 |
| 2,126,323 | 8/38 | Handley | 197—153 X |
| 2,467,881 | 4/49 | Brumhill | 197—151 |

FOREIGN PATENTS 1,172,198 10/58 France.

ROBERT E. PULFREY, *Primary Examiner.*

R. A. LEIGHEY, *Examiner.*